United States Patent Office 3,474,704
Patented Oct. 28, 1969

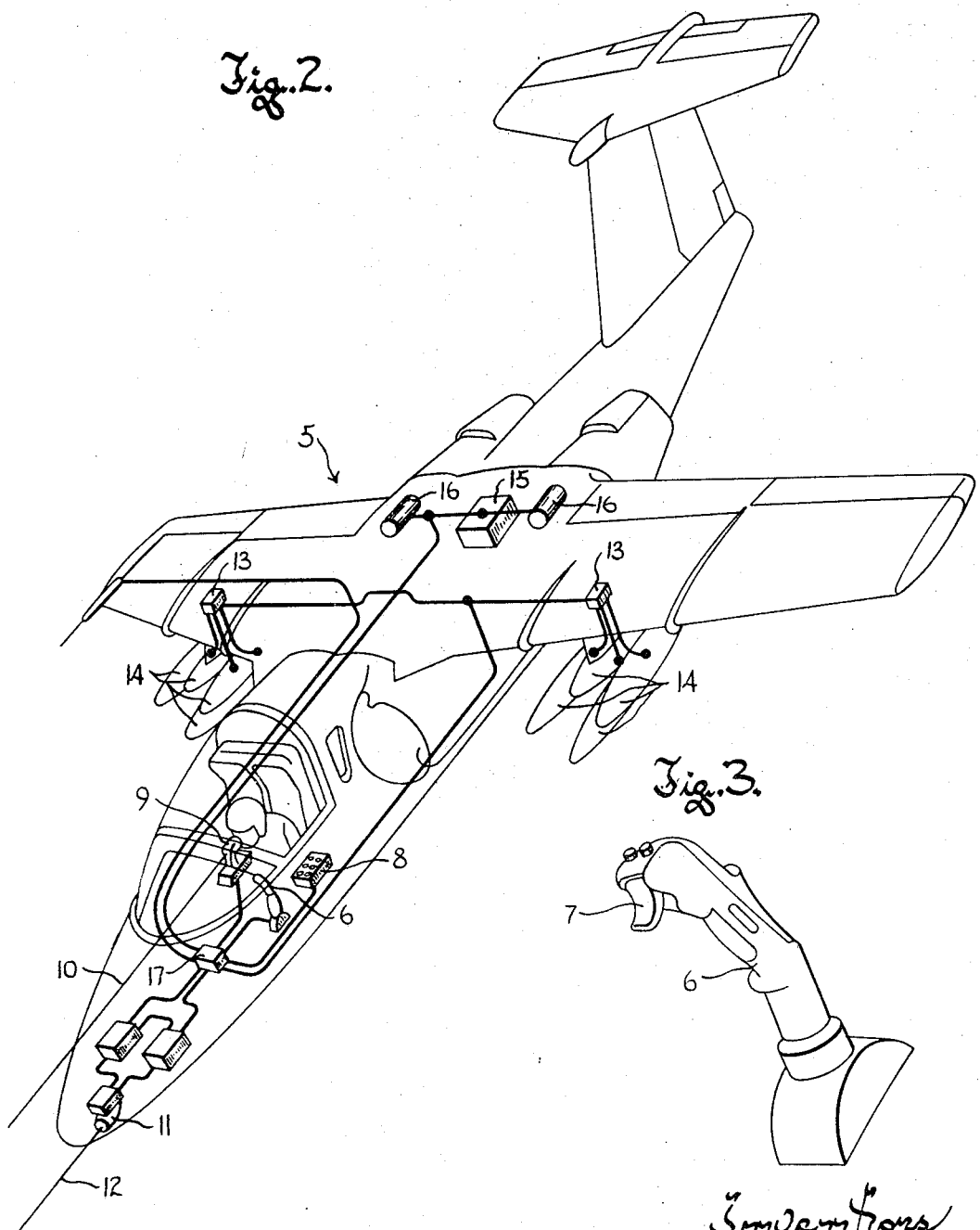

3,474,704
TOSS BOMBING INSTRUMENT HAVING IMPROVED MEANS FOR ACQUISITION OF DISTANCE DATA AT PICKLE
Per Torsten Faxén and Hans T. Ericsson, Jonkoping, Sweden, assignors to Saab Aktiebolag, Linkoping, Sweden, a corporation of Sweden
Filed Nov. 13, 1967, Ser. No. 682,480
Claims priority, application Sweden, Nov. 16, 1966, 15,642/66
Int. Cl. F41g 9/02; B64d 1/06
U.S. Cl. 89—1.5                                    4 Claims

ABSTRACT OF THE DISCLOSURE

Laser ranging apparatus connected with the pickle switch of a toss bombing instrument emits one brief laser pulse at pickle. Its output is fed to a first resolver that produces an output corresponding to horizontal aircraft-to-target distance. A second resolver, connected with barometric altimeter means, also produces a horizontal distance output. The two resolvers are connected with a comparator which feeds to a ballistic computer the output of the first resolver when it differs by less than a predetermined amount from that of the second resolver, but otherwise feeds the ballistic computer the output of the second resolver.

---

This invention relates to toss bombing instruments of the general type disclosed in U.S. Patent No. 2,609,729; and, more particularly the invention pertains to a toss bombing instrument having means for very accurately ascertaining a distance that is a determinant of the position in the airspace of a bombing aircraft in which the instrument is carried relative to a target intended to be struck by a bomb released from the aircraft during the pullout from a dive toward the target.

In toss bombing, an aircraft is used in which there is a fixed optical sight, similar to a gunsight, that is aligned substantially parallel to the longitudinal axis of the aircraft. With the toss bombing instrument in operation and adjusted for certain factors that can be known to the pilot, the aircraft is maneuvered into a dive toward a target. The angle of the dive (i.e., its steepness or shallowness) is not critical so long as it is within the rather broad operational limits of the instrument.

When the optical sigth axis is accurately aligned on the target, the pilot actuates a so-called pickle switch that causes the toss bombing instrument to begin a continuous automatic computation which terminates at bomb release. After pickle (i.e., after actuation of the pickle switch), the pilot can begin a pullout from the drive at a time and at a rate that are substantially a matter of discretion with him, the main limitation on the pullout maneuver being that it must be confined to the vertical plane through the target that contained the aircraft at the instant of pickle, which is to say that there must be no yaw or roll of the aircraft during the pullout.

The computation made by the toss bombing instrument from and after pickle eventuates in the automatic issuance of an impulse signal that effects release of a bomb from the aircraft. The release impulse is produced at that instant during the pullout in which the position of the aircraft relative to the target, and the velocity vector of the aircraft (its speed and direction of flight), are in such relationship to one another that the trajectory of a bomb then released from the aircraft will carry it to the target.

Certain of the values which must be taken into account in the toss bombing calculation are set into the instrument manually before the bomb aiming dive is initiated, as for example weight of the aircraft, head wind or tail wind velocity component, and bomb ballistic coefficient. Sensing devices on the aircraft supply the computing instrument with other data such as the attitude of the aircraft, its angle of attack and its airspeed.

Toss bombing instruments have been built to make the bomb release computation in various ways, but in every instance the accuracy with which the instrument effects bomb release depends upon the accuracy of acquisition at pickle of distance and angle data by which the position of the aircraft relative to the target is defined. The required angle data is in the form of an output corresponding to the angle between the horizontal and a line connecting the target with the aircraft, and can be obtained with satisfactory accuracy from a gyro instrument. The only distance data that can be obtained at the aircraft are the height of the aircraft above some arbitrarily selected level (e.g., sea level; target elevation above sea level), which can be delivered to the instrumentality in the form of an output from barometric altimeter means, and the direct (slant range) distance between the aircraft and the target, which can be delivered to the instrumentality in the form of an output from ranging apparatus.

A barometric altimeter instrument does not supply the distance information needed at pickle with the desired degree of accuracy because it must be manually adjusted for elevation of the target above sea level and for prevailing sea level barometric pressure at the target, and its output, which is actually no more than a function of barometric pressure at the aircraft, is accurate only to the extent that these manual settings have been properly made and to the extent that the prevailing variation of atmospheric pressure with altitude corresponds with the assumed conditions for which the instrument is calibrated. The barometric altimeter instrument is especially unreliable as a source of distance information for toss bombing from shallow dive angles, when a small error in height information produces a substantial error in the calculation of aircraft-to-target distance.

Obviously radar altimeter means can seldom be satisfactorily used for direct determination of the height of an aircraft above a target because hills and valleys in the vicinity of the target would cause its outputs to bear no relation to the acual verical distance between aircraft and target.

Heretofore radar ranging apparatus has been used in many cases for determination of the slant range distance from the aircraft to the target because radar can yield more accurate distance data than a barometric altimeter instrument. However, even radar does not possess the degree of accuracy required for precise toss bombing, especially at shallow angles of dive. The reason for this is that a radar beam diverges to a substantial extent, and therefore a radar beam emitted from a diving aircraft toward a target on the surface impinges a substantial area around the target, such area being greatest in shallow dives, that is, when the axis of the beam is most nearly parallel to the surface. Radar apparatus has no means for selecting that part of the return from this area that represents the target.

The present invention proceeds from a recognition that the very narrow, substantially non-divergent beam of a laser offers the possibility of very accurate determination of aircraft-to-target distance in toss bombing, especially in toss bombing at shallow angles of dive.

While laser ranging is entirely feasible, and is in fact a developed art, the pulse frequency of a laser is dependent upon the cooling of its transmitter and the charging capacity of its pump unit. To provide for the issuance of any substantial number of laser pulses during the course of a toss bombing attack would require a relatively large energy source and heavy and bulky cooling means, so that the apparatus would be unsuitable for aircraft installation. Furthermore, it would be necessary to extrapolate distance data in the intervals between pulses, with the result that a certain amount of inaccuracy in the distance information acquired by continuously pulsed laser ranging apparatus would be almost inevitable.

With the foregoing in mind it is a general object of the present invention to provide a toss bombing instrumentality having much greater accuracy than such instrumentalities heretofore available, particularly in shallow dive attacks, and wherein laser ranging is utilized for the acquisition of distance data without entailing the disadvantages of a laser that was continuously pulsed during the toss bombing maneuver.

More specifically it is an object of this invention to provide a toss bombing instrumentality comprising laser ranging apparatus that is so connected with the pickle switch as to emit a single laser pulse at pickle for the purpose of acquiring distance information for a toss bombing maneuver, so that energy requirements for the laser are low and no particular provision need be made for cooling of the laser transmitter, and which instrumentality affords very accurate bombing results, being especially superior to toss bombing instruments heretofore available with respect to its accuracy in bombing from shallow dives.

It is another specific object of this invention to provide a toss bombing instrumentality which is capable of utilizing an output corresponding to a distance value that is acquired at pickle by means of a single pulse emitted from a ranging apparatus, which ranging apparatus can be, for example, either laser or radar. In those cases where it is possible to emit a radar beam that is sufficiently nondivergent for satisfactory ranging, the advantages of single pulse radar ranging will be apparent, and include low susceptibility to jamming.

It is also a specific object of this invention to provide a bombing instrument of the character described that is capable of accurate dive toss bombing from a wide range of initial altitudes and dive angles and also of pull-up toss bombing from level flight, and which instrumentality comprises laser or similar apparatus that emits a single ranging pulse at pickle for the acquisition of an accurate aircraft-to-target slant range distance value.

While laser ranging is usually accurate and reliable, there are certain situations in which the distance information acquired in single-pulse laser ranging will be less reliable than that obtained from barometric altimeter means. For example, if the laser beam is reflected back to the bombing aircraft from a cloud or column of smoke above the target, the slant range distance output that will be fed to the toss bombing computer from the laser ranging apparatus will correspond to a distance substantially smaller than the true aircraft-to-target distance. Again, if the laser axis is for some reason momentarily off the target at the instant of pickle, as because of rough air in the vicinity of the target, the laser beam may be reflected from a point on the surface that is at a substantially greater or lesser distance from the aircraft than the target, likewise producing a substantially inaccurate slant range distance value.

The conditions just supposed are of course unusual ones, but on those infrequent occasions that they occurred, it would obviously be preferable to use distance data obtained from barometric altimeter means, rather than that obtained from laser ranging. With this in mind it is another object of this invention to provide in a bombing instrument of the character described means for producing a first output corresponding to a function of aircraft-to-target distance at the instant of pickle as sensed by laser ranging means, means for producing a second output corresponding to a function of aircraft-to-target distance at the instant of pickle as sensed by barometric altimeter means, and means for comparing the first and second outputs and for rejecting the second output and utilizing the first if the difference between said outputs has less than a predetermined value and for rejecting the first output and utilizing the second if the difference between them has more than said predetermined value.

Thus it can be said to be another object of this invention to provide a bombing instrument of the character described that is equipped with two different distance sensing means, by which two values of distance are acquired at pickle; means for comparing the outputs from the two sensing means; and means for utilizing the output from whichever of the two sensing means is more likely to be accurate under the circumstances.

Another object of this invention is to provide a bombing instrument of the character described that incorporates laser ranging apparatus for acquiring aircraft-to-target distance data at pickle, and, further, incorporates barometric altimeter means by which such distance information is also acquired and which serves as a backup system in the event the laser ranging apparatus should for any reason fail or be unreliable.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate one complete example of the physical embodiment of the invention constructed according to the best mode so far devised for the practical application of the principles thereof, and in which:

FIGURE 2 is a schematic perspective view of an aircraft equipped with a toss bombing instrumentality embodying the principles of this invention;

FIGURE 3 is a perspective view on a larger scale of the control stick of the aircraft, in which is incorporated the pickle switch of the toss bombing instrument;

Figure 1:
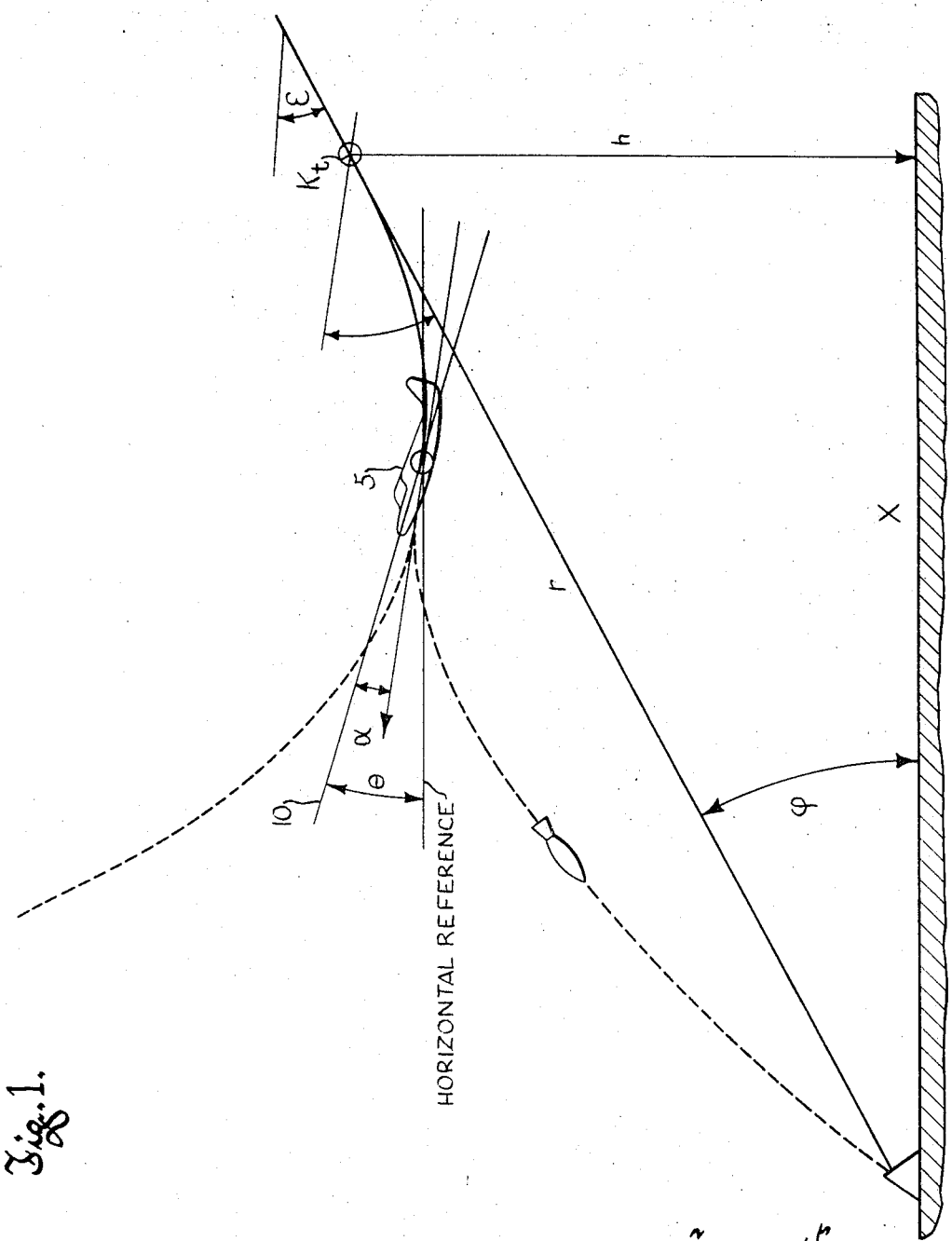
FIGURE 1 is a diagram representing a toss bombing attack and illustrating certain of the values that must be taken into account by the toss bombing instrumentality in computation of the release equation.

Referring now to the accompanying drawings, the numeral 5 designates generally an aircraft equipped with toss bombing apparatus embodying the principles of this invention and having a conventional control stick 6 on which is mounted a pickle switch 7, a console 8 that is readily accessible to the pilot, an optical sight 9 that defines an axis 10 which is substantially parallel to the longitudinal axis of the aircraft, ranging apparatus 11 that is mounted in the nose of the aircraft to project a beam along an axis 12 that is parallel to the optical sight axis, and bomb release mechanism 13 illustrated as mounted to carry bombs 14 beneath the wings of the aircraft. The ranging apparatus is of the type that emits a pulsed beam, and is preferably a laser apparatus although it could be a radar unit.

Electrical power for the optical sight 9, ranging apparatus 11, release impulse mechanism 13 and other elements of the apparatus is provided from the battery 15 and generators 16 that are conventionally present in a bombing aircraft, it being understood that there are suitable connections between these several elements, which connections are illustrated as comprising a junction box 17.

Figure 4:
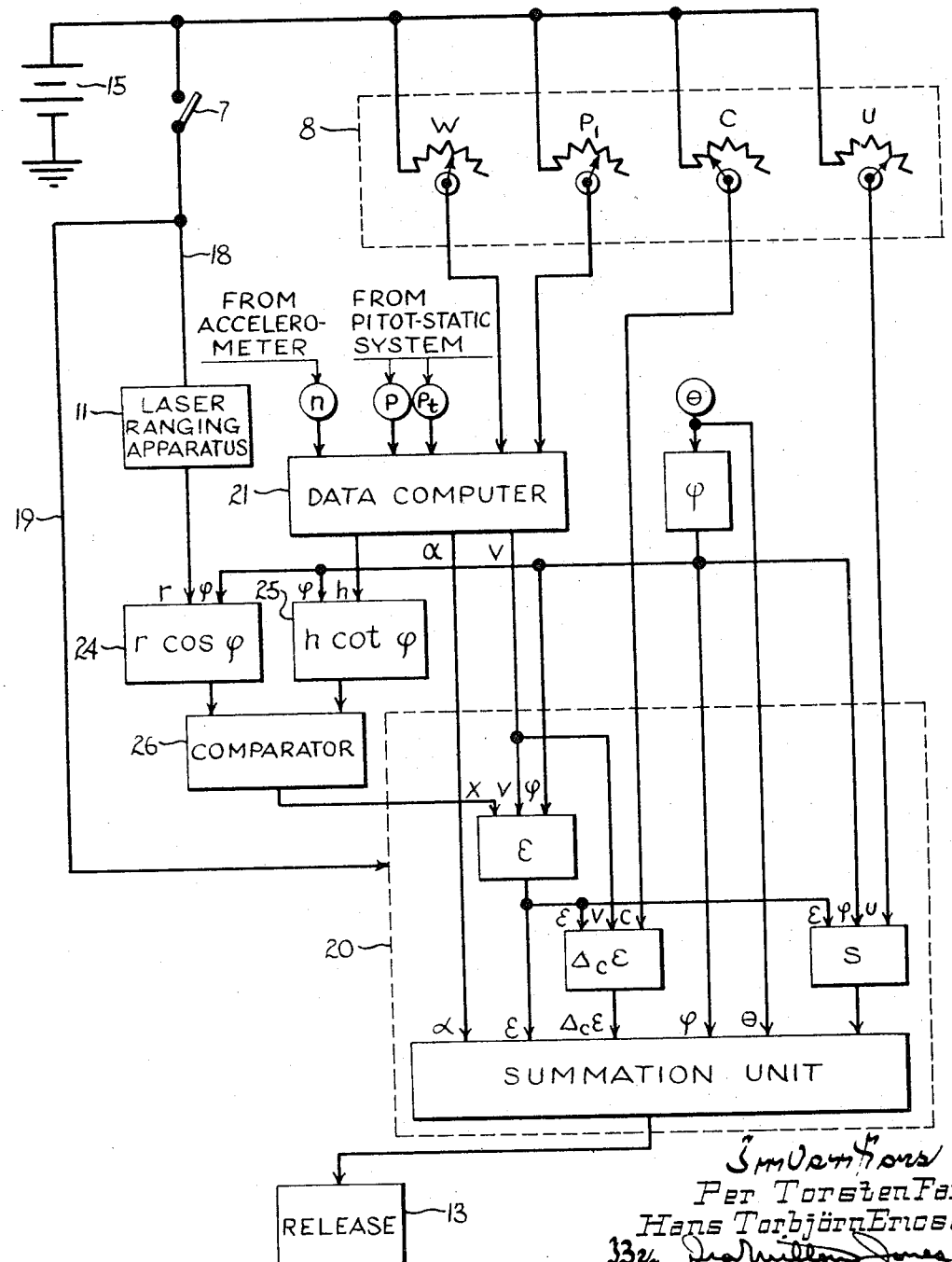
FIGURE 4 is a block diagram of a toss bombing instrument embodying the principles of this invention.

Preliminary to making a bombing run the pilot of the aircraft manually adjusts controls on the console 8 for the bombing mode to be used, for selection of the bombs to be released, and for certain values that will remain substantially constant throughout the bombing maneuver, namely the weight W of the aircraft, static pressure $P_1$ of the air at the target altitude, the bomb ballistic coefficient C, and the headwind or tailwind velocity component U (it being assumed that the bombing run will be made parallel to the wind). As shown in FIGURE 4, each of these controls comprises a variable resistor for producing an electrical output of a value that corresponds to the value for which the control is adjusted.

To begin the bombig maneuver the pilot enters a dive that will align the axis 10 of the optical sight 9 upon the target. When such alignment is established, he actuates the pickle switch 7, which has a suitable connection 18 with the ranging apparatus 11 whereby the latter is caused to emit a single ranging pulse from which it produces an output corresponding to the aircraft-to-target slant range distance $r$ at the instant of pickle. The pickle switch also has a connection 19 with a ballistic computer 20, whereby actuation of the pickle switch causes the computer to initiate a calculation that eventuates in the issuance to the release mechanism 13 of an impulse signal that effects release of one or more of the bombs 14 in accordance with the bomb selection adjustment previously made on the console 8.

The ballistic computer 20 is shown very diagrammatically in FIGURE 4 because it can comprise any one of the known mechanisms for computing one or another of the several known toss bombing equations, all of said mechanisms being essentially variants of one another and based upon the fundamental teachings of U.S. Patent No. 2,609,729. (In this connection reference can also be made to U.S. Patents Nos. 3,132,561 and 3,264,451.)

In any case the ballistic computer 20 receives inputs from the console 8, from the ranging apparatus 11 and from a data computer 21. The data computer, which is also well known, receives inputs from cetrain sensing instrumetnalities that are conventionally present in aircraft intended for toss bombing, namely gyro means, airspeed and altitude responsive means connected with the pitot-static system, and angle of attack sensing means; and the data computer produces outputs that correspond to the altitude $h$ of the aircraft, its angle of attack $\alpha$ and its airspeed $v$. Thus the outputs from the data computer, which are fed as inputs to the ballistic computer 20, correspond to values that change constantly from the instant of pickle to the instant of bomb release.

In general, as the aircraft enters a toss bombing dive the instrument begins a continuous computation of the angle of divergence $\epsilon$ between the path that the aircraft is actually traversing and that which it would have to be following in order for a bomb then released from it to hit the target. As is conventional, this computation of $\epsilon$ can comprise the calculation of an ideal angle of divergence $\epsilon_i$, corresponding to conditions of bomb fall through a vacuum, and the correction of $\epsilon_i$ by a value $\Delta_c\epsilon$ which compensates for the drag of the bomb in falling through air.

The calculation of angle of divergence $\epsilon$ prior to pickle is based, inter alia, upon altitude data furnished by the barometric alitmeter means and aircraft attitude data derived from the gyro means. The instrumentality by which this calculation is made can be of the type disclosed in Patent No. 3,264,451 to P. T. Faxen et al.

At the pickle point $K_t$ (see FIGURE 1), the ranging apparatus produces an output corresponding to a slant range distance value $r$, as explained above; and at the same instant there is available from the barometric altimeter means an output corresponding to the height $h$ of the aircraft above the target. From the gyro means an output is available that corresponds to the value of the attitude angle $\theta$ of the aircraft, that is, the angle between the horizontal and the axis 10 of the optical sight 9. For practical purposes, at pickle, the attitude angle $\theta$ is the same as the target angle $\varphi$ (the angle between the horizontal and a straight line which connects the airplane and the target). Hence the data available from the ranging apparatus and from the barometric altimeter means can be compared in terms of the projected horizontal distance X between the aircraft and the target, by means of the relationships $$X_r = r \cos \varphi$$
$$X_h = h \cot \varphi$$

The calculation of these relationships can be accomplished by means of resolvers 24 and 25 which respectively receive inputs from the ranging apparatus and from the barometric altimeter means, and both of which receive inputs from the gyro means, said resolvers being described hereinafter.

In theory, $X = X_r = X_h$; but in practice there will usually be some difference between the values $X_r$ and $X_h$, and when this difference is within the limits of an arbitrarily assigned value $\Delta X$ it is reasonable to assume that the value $X_r$, based upon the output of the ranging apparatus, more nearly corresponds with the true value of X than the output $X_h$ derived from barometric data; whereas if the difference between $X_r$ and $X_h$ exceeds $\Delta X$, the value of $X_h$ corresponds more nearly to X for reasons explained above. Preferably the value $\Delta X$ is selected to correspond to the known limits of error of barometric altimeter means so that it represents a practical criterion of reliability.

The outputs of the resolvers 24 and 25 are supplied to a comparator 26 which in effect tests them against the criterion value $\Delta X$, selects whichever of the two values $X_r$ and $X_h$ is likely to be the more accurate, and feeds it to the ballistic computer 20.

The ballistic computer utilizes this distance value input in the calculation of the release equation and also utilizes in that calculation certain other inputs that correspond, for example, to the changing values of attitude angle $\theta$ of the airplane, its angle of attack $\alpha$, its velocity $v$, and to the target angle $\varphi$ at pickle.

Figure 5:
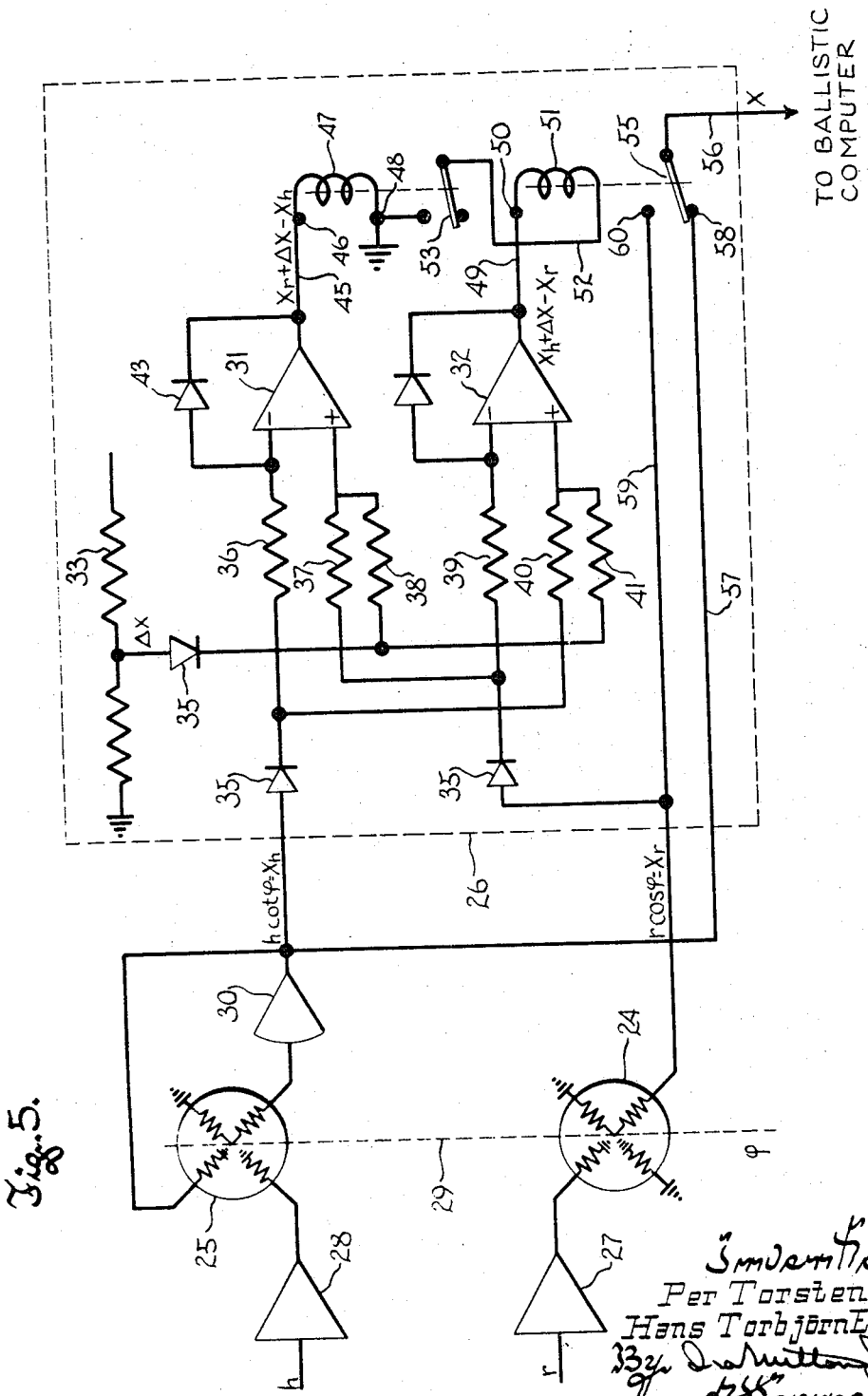
FIGURE 5 is a circuit diagram of the apparatus of this invention for comparing distance values sensed at pickle by barometric altimeter means and by laser ranging apparatus and for selecting whichever of those values is likely to be the more accurate.

Returning now to a consideration of the apparatus by which values of slant range distance $r$ and altitude $h$ are taken at pickle and compared (see FIGURE 5), the output of the ranging apparatus is fed to the $X_r$ resolver 24, in the form of an alternating current, through a buffer amplifier 27. The shaft 29 of that resolver is at all times maintained angularly adjusted in correspondence with the attitude angle $\theta$, and therefore the output voltage of the resolver 24 at pickle corresponds to $X_r = r \cos \varphi$.

To the $X_h$ resolver 25 there is fed, through a buffer amplifier 28, an alternating current that corresponds to the altitude $h$ of the aircraft above the target, as sensed by the barometric altimeter means functioning in cooperation with the manually adjustable element on the console for pressure $P_1$ at target altitude. The shaft of the resolver 25 can be common to the $X_r$ resolver 24 and is at all times maintained in an angular position that corresponds with the attitude angle $\theta$; therefore the output of the resolver 25 is in the form of an alternating current corresponding, at pickle, to $X_h = h \cot \varphi$.

The output of the $X_r$ resolver 24 is delivered to the comparator 26 directly; that of the $X_h$ resolver 25 is fed to the comparator through a high gain amplifier 30.

The comparator comprises, in general, a pair of differential amplifiers 31 and 32 and a reference voltage transducer 33 that produces an alternating reference current which corresponds to $\Delta X$, the predetermined difference limit value mentioned above. The three voltages corresponding to $X_r$, $X_h$ and $\Delta X$ are fed into the inputs of the differential amplifiers 31 and 32 through half-wave rectifiers comprising diodes 35 and through suitable resistors 36, 37, 38 and 39, 40, 41. The circuit is so arranged that the voltages corresponding to $X_r$ and to $\Delta X$ are supplied to the positive input terminal of differential amplifier 31 while the voltage corresponding to $X_h$ is fed to its negative input terminal; and the voltages corresponding to $X_h$ and to $\Delta X$ are fed to the positive input terminal of differential amplifier 32 while the voltage corresponding to $X_r$ is supplied to its negative input terminal. Between the negative terminal of each differential amplifier and its output there is connected a diode rectifier 43 that has its forward direction toward the amplifier output.

The output of differential amplifier 31 is connected by means of a conductor 45 with one terminal 46 of a first relay coil 47, the other terminal 48 of that coil being grounded. The output of amplifier 32 is connected by means of a conductor 49 with one terminal 50 of a second relay coil 51, but the other terminal of that coil is connected as by a conductor 52 with the switching element 53 associated with the first relay coil, through which a connection to ground can be made. When the switching element 53 is in its normal position, the circuit of the second relay coil 51 is open, hence the second relay coil cannot be energized unless the first relay coil 47 is energized sufficiently to actuate its switching element 53.

Associated with the second relay coil 51 is a double throw switching element 55 that has its common terminal connected with a conductor 56 by which current corresponding to the selected value of horizontal aircraft-to-target distance X is fed to the ballistic computer.

A conductor 57 connects the $X_h$ resolver 25 with the normally engaged terminal 58 of the double-throw switching element 55, while another conductor 59 connects the $X_r$ resolver 24 with the other terminal 60 of that switching element. It will be seen that the current fed into the ballistic computer by way of the conductor 56 will have a value which corresponds to $h \cot \varphi$ unless the second relay coil 51 is energized sufficiently to actuate its associated switch element 55. But such energization of the second relay coil cannot take place unless both of the following conditions are satisfied:

$$X_r > X_h - \Delta X$$
$$X_r < X_h + \Delta X$$

which is to say that the difference between $X_r$ and $X_h$ does not exceed $\Delta X$.

Specifically, the output of differential amplifier 31 corresponds to $X_r + \Delta X - X_h$, and if that sum is positive, i.e., if $X_r > X_h - \Delta X$, said amplifier produces a current output which energizes the first relay coil 47 and actuates its associated switching element 53. If the output is negative, the diode 43 connected across differential amplifier 31 becomes conductive so that the potential across the first relay coil becomes zero. Similarly, the output of differential amplifier 32 corresponds to $X_h + \Delta X - X_r$, and the second relay coil 51 is energized only if $X_r < X_h + \Delta X$, while if the output of differential amplifier 32 is negative the diode 43 across that amplifier becomes conductive and prevents energization of the second relay coil 51.

Since the second relay coil can be energized only when the distance value sensed by the ranging device does not differ from that sensed by the altimeter means by more than $\Delta X$, the output corresponding to $X_r$ is fed to the ballistic computer only when that value is likely to be more accurate than the value $X_h$ derived from the barometric altimeter means; and otherwise the value $X_h$ is used in the bomb release computation. Hence the instrumentality of this invention will never be less accurate than prior devices that relied solely upon barometric altimeter means for sensing a distance value at pickle, and will usually be substantially more accurate than such prior devices.

It will be apparent that the comparison effected by the comparator need not necessarily involve values corresponding to horizontal aircraft-to-target distance. The comparator could obviously be fed an input corresponding directly to the slant-range distance value $r_r$ as sensed by the ranging apparatus and an input corresponding to the slant range distance value $r_h$ as derived from a trigonometrical calculation based upon altitude as sensed by the barometric altimeter means; or it could be fed with an input corresponding directly to altitude $h_h$ as sensed by the altimeter means and with an input corresponding to the valve of $h_r$ as derived from a trigonometrical calculation based upon slant-range distance as sensed by the ranging apparatus. In each instance suitable limits of difference between the input values will be utilized in effecting automatic selection of the distance value that is the more likely to be accurate under the circumstances.

It will be recognized that the ranging apparatus need not be constrained to emit its beam along an axis that is fixed with respect to the longitudinal axis of the aircraft but can be swingably mounted so that the bombing instrumentality can be used for attacks which are initiated from level flight, with level flight continued until the instant of bomb release (as in conventional level bombing), or with release occurring during a pullup initiated at or after pickling. Means for adapting toss bombing instrumentalities to these bombing modes are known in the art, and it will be apparent that the apparatus of the present invention is directly adaptable to such bombing modes and provides accurate distance data by which they can be made highly effective.

It will be understood that when the ranging apparatus is swingably mounted it must be provided with some sort of aiming apparatus by which a bombardier can keep its axis aligned on the target while the pilot maneuvers the aircraft through the pickle point, and that the means for producing an angle output corresponding to $\theta$ must then include means for producing an output corresponding to the angle between the longitudinal axis of the aircraft and the axis of the ranging apparatus, in accordance with known practice.

From the foregoing description taken with the accompanying drawings it will be apparent that this invention provides toss bombing apparatus comprising single pulse ranging apparatus for obtaining a distance value at pickle that is a determinant of the position in space of a toss bombing aircraft relative to its target, and that such ranging apparatus can comprise a very light and compact laser unit having low energy requirements by reason of its emitting only a single laser beam pulse at pickle. It will also be apparent that the invention provides very accurate toss bombing apparatus in that it comprises means for comparing the distance value sensed at pickle by the ranging apparatus with that sensed by the heretofore conventional barometric altimeter means, and for selecting and utilizing whichever of those two distance values is more likely to be accurate under the circumstances.

What is claimed as our invention is:

1. Toss bombing apparatus comprising a pickle switch that is to be actuated when an axis that is defined with respect to an aircraft in which the apparatus is carried is in a predetermined alignment with a target, means for producing an angle output corresponding to a function of the angle between said axis and the horizontal, barometric means for producing a height output corresponding to a function of altitude of the aircraft, and computer means for utilizing the angle output and at least one other output to produce a bomb release impulse when the velocity vector of the aircraft and its distance from the target are such that a bomb then released from the aircraft will strike the target, said apparatus being characterized by:

(A) distance measuring means of the type comprising
  (1) means for emitting a pulsed beam, and
  (2) means for producing an output corresponding to the distance between said pulsed beam emitting means and a surface from which its beam is reflected;

(B) means so connecting said distance measuring means with the pickle switch that upon actuation of the pickle switch a single beam pulse is emitted from the distance measuring means and the same produces an output which is a function of the distance between the aircraft and a target at the instant the pickle switch is actuated; and (C) comparison means connected with said distance measuring means to receive said output therefrom and with the barometric means to simultaneously receive therefrom a corresponding output, said comparison means comprising
   (1) means for comparing said outputs with one another,
   (2) means for feeding to the computer said corresponding output from the barometric means, to the exclusion of said output from the distance measuring means, when said corresponding output differs by more than a predetermined amount from the output from the distance measuring means, and
   (3) means for feeding to the computer said output from the distance measuring means, to the exclusion of said corresponding output from the barometric means, when the output from the distance measuring means differs by less than said predetermined amount from said corresponding output.

2. The toss bombing apparatus of claim 1, further characterized by:
   said means for emitting a pulsed beam comprising a laser.

3. Toss bombing apparatus comprising a pickle switch that is to be actuated when an axis that is defined with respect to an aircraft in which the apparatus is carried is in a predetermined alignment with a target, means for producing an angle output corresponding to a function of the angle between said axis and the horizontal, barometric means for producing a height output corresponding to a function of altitude of the aircraft, and computer means for utilizing the angle output and at least one other output to produce a bomb release impulse when the velocity vector of the aircraft and its distance from the target are such that a bomb then released from the aircraft will strike the target, said apparatus being characterized by:
   (A) distance measuring means of the type comprising
      (1) means for emitting a pulsed beam upon actuation of the pickle switch, and
      (2) means for producing an output corresponding to the distance between said pulsed beam emitting means and a surface from which its beam is reflected;
   (B) means connected with said distance measuring means and with said angle output means for producing a first horizontal distance output;
   (C) means connected with said barometric means and with said angle output means for producing a second horizontal distance output;
   (D) comparison means connected with both of said horizontal distance output means to receive their outputs and comprising
      (1) means for comparing said horizontal distance outputs with one another,
      (2) means for feeding to the computer the second horizontal distance output, to the exclusion of the first, when the second horizontal distance output differs by more than a predetermined amount from the first, and
      (3) means for feeding to the computer the first horizontal distance output, to the exclusion of the second, when the first horizontal distance output differs from the second by less than said predetermined amount.

4. Toss bombing apparatus comprising a pickle switch that is to be actuated when an axis that is defined with respect to an aircraft in which the apparatus is carried is in a predetermined alignment with a target, means for producing an angle output corresponding to a function of the angle between said axis and the horizontal, barometric means for producing a height output corresponding to a function of altitude of the aircraft, and computer means for utilizing the angle output and at least one other output to produce a bomb release impulse when the velocity vector of the aircraft and its distance from the target are such that a bomb then released from the aircraft will strike the target, said apparatus being characterized by:
   (A) distance measuring means of the type comprising
      (1) means for emitting a pulsed beam upon actuation of the pickle switch, and
      (2) means for producing an output corresponding to the distance between said pulsed beam emitting means and a surface from which its beam is reflected;
   (B) first resolver means to which the output of said distance measuring means is fed and which is connected with said angle output means to produce a first distance value output that substantially corresponds to the horizontal distance between the target and the aircraft at the instant the pickle switch is actuated;
   (C) a second resolver means connected with the barometric altimeter output means and with said angle output means and responsive to their outputs for producing a second distance value output that substantially corresponds to the horizontal distance between the target and the aircraft at the instant the pickle switch is actuated; and
   (D) comparator means with which said first and second resolver means are connected and which is connected with the computer means, said comparator means comprising
      (1) means for comparing the first distance value output with the second distance value output,
      (2) means for transferring the first distance value output to the computer to the exclusion of the second distance value output when the distance value outputs differ by less than a predetermined amount, and
      (3) means for transferring the second distance value output to the computer, to the exclusion of the first distance value output, when the distance value outputs differ by more than said predetermined amount.

References Cited

UNITED STATES PATENTS

| | | |
|---|---|---|
| 2,480,208 | 8/1949 | Alvarez. |
| 2,609,729 | 9/1952 | Wilkenson et al. |
| 2,930,035 | 3/1960 | Altekruse. |
| 2,988,960 | 6/1961 | Helgeson et al. |

FOREIGN PATENTS

| | | |
|---|---|---|
| 957,235 | 5/1964 | Great Britain. |

SAMUEL W. ENGLE, Primary Examiner

U.S. Cl. X.R.

235—61.5